United States Patent [19]

Calzone

[11] Patent Number: 4,765,785
[45] Date of Patent: Aug. 23, 1988

[54] TRAILER DRILLING MACHINE

[76] Inventor: Ronald J. Calzone, HCR 60, Box 296, Dixon, Mo. 65459

[21] Appl. No.: 84,922

[22] Filed: Aug. 12, 1987

[51] Int. Cl.$^4$ .............................................. B23B 45/14
[52] U.S. Cl. .................... 408/109; 408/77; 408/91
[58] Field of Search ............ 408/77, 78, 88, 91, 408/98, 108, 109, 236

[56] References Cited

U.S. PATENT DOCUMENTS

| | | | |
|---|---|---|---|
| 1,247,341 | 11/1917 | Skinner | 408/77 |
| 2,283,338 | 5/1942 | Pégard | 408/77 X |
| 2,546,957 | 3/1951 | Ray | 164/86 |
| 3,180,183 | 4/1965 | Stanley et al. | 77/34.6 |
| 3,730,634 | 5/1973 | Gerber | 408/22 |
| 3,981,605 | 9/1976 | Wirsing | 408/88 |
| 4,108,566 | 8/1978 | Jones | 408/115 R |
| 4,494,895 | 1/1985 | Leaf | 408/236 |

Primary Examiner—Eugene F. Desmond
Attorney, Agent, or Firm—Glenn K. Robbins

[57] ABSTRACT

A machine for drilling holes in the deck of a flat bed or other type trailer. The machine has a cross beam and rails for a wheeled carriage supporting a drill press for drilling holes in the deck in an X-direction across the deck. The cross beam and rails are carried upon wheeled trucks which are moveable longitudinally along the length of the deck in a Y-direction. The counteract thrust and to anchor the machine, adjustable clamps are provided at opposite ends of the cross beam which bear against the underside or other suitable fastening point of the trailer. The cross beam ties the machine together in providing support for the wheeled carriage, the rails, wheeled trucks and the clamps to provide a rugged and easily maneuverable machine for moving a drill press in any desired X-Y direction.

9 Claims, 3 Drawing Sheets

TRAILER DRILLING MACHINE

BACKGROUND OF THE INVENTION

In the past wooden deck trailers have been manually drilled by electric hand drills and the like to provide holes for fastening the wooden deck to an underlying frame. Such manual drilling is labor consuming and requires considerable time for completion of the job and contributes to extensive cost and time in the operation. Such hole drilling has been a particular problem in the drilling of large sized flat bed wooden deck trailers in the initial manufacture as well as in deck replacement which may be required through the wear and tear encountered in heavy usage in hauling goods of one type or another and heavy equipment.

SUMMARY OF THE INVENTION

By means of the instant invention there has been provided a portable drilling machine which may be easily and simply employed on the top of a flat bed trailer to drill holes in a deck in any X-Y direction across the deck and along the length of the deck.

The machine is comprised of a pair of cross rails extending across the deck and supported at opposite ends on the opposite sides of the deck by wheeled trucks which are moveable longitudinally along the length of the deck in a Y-direction. A wheeled carriage supports a drill press and is moveable along the rails in an X-direction. The drill press is of heavy duty construction and may be raised and lowered in conventional fashion to perform the drilling operation.

A cross beam forms a support for the cross rails located on opposite sides of the beam and also is supported upon the wheeled trucks and provides a tie in base for the structural components of the machine. The wheeled carriage has two sets of upper and lower wheels which bear on the rails on opposite sides of the beam which with the cross rails may serve as a guide for side thrust. The lower wheels of the carriage provide a bearing surface against the rails to counteract any tendency of the carriage to tilt while the drilling operation is carried out.

In order to affix the machine to the deck during use clamps are connected at opposite sides which are adjustable for different widths of trailers. The clamps are connected to the wheeled trucks and are adapted to bear against the underside of the trailer to provide firm anchoring of the machine and to counteract any upward thrust developed during the drilling operation.

The machine is readily installed upon standard flat bed trailers having wooden decks or other surfaces to be drilled and may be adapted to van type trailers and the like. The erection and operation can be rapidly and efficiently employed by relatively unskilled workmen to provide an accurate and cost effective drilling. The machine is rugged and made of standard components and lends itself to use in a wide variety of drilling usages.

The above features are objects of this invention. Further objects will appear in the detailed description which follows and will be further apparent to those skilled in the art.

For the purpose of illustration of this invention, a preferred embodiment thereof is shown in the accompanying drawing. It is to be understood that the drawing is for purpose of description only and that the invention is not limited thereto.

IN THE DRAWING

DESCRIPTION OF THE INVENTION

Figure 1:
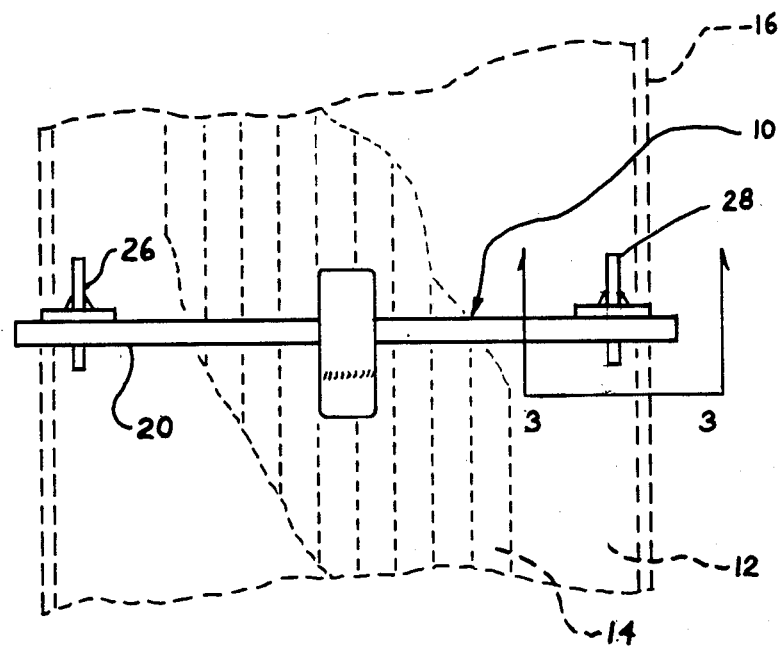
FIG. 1 is a top plan view of the trailer drilling machine positioned on a fragmentary portion of a trailer deck shown in dotted lines.
Figure 2:
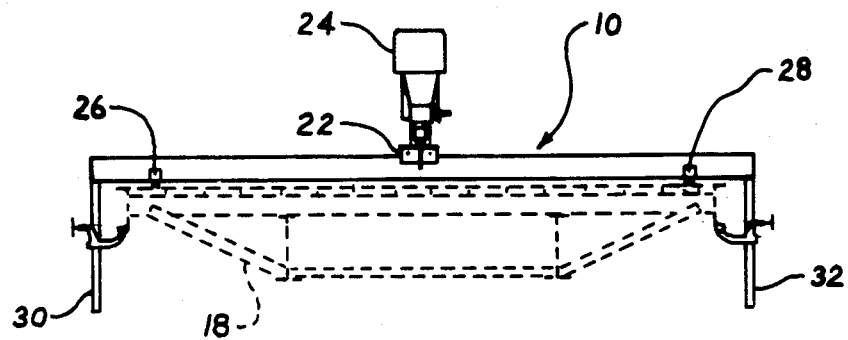
FIG. 2 is a view in front elevation of the trailer drilling machine on the trailer deck.

The drilling machine of this invention is generally indicated by the reference numeral 10 in FIGS. 1 and 2. It is shown employed on a flat bed trailer 12, shown in dotted lines, having a planked wooden deck 14, side rail 16 and a support frame 18.

The drilling machine as shown in FIGS. 1 and 2 is comprised of a cross beam 20 supporting a pair of rails as will be further described; and a wheeled carriage 22 supporting a drill press 24 moveable along the beam from one side of the trailer to the other. The beam is supported at its opposite ends upon wheeled trucks 26 and 28 moveable on the deck 14 along the length of the trailer. Clamping of the machine is provided by laterally adjustable clamps 30 and 32 to clamp against the underside of the trailer for firm anchoring of the machine.

Figure 4:
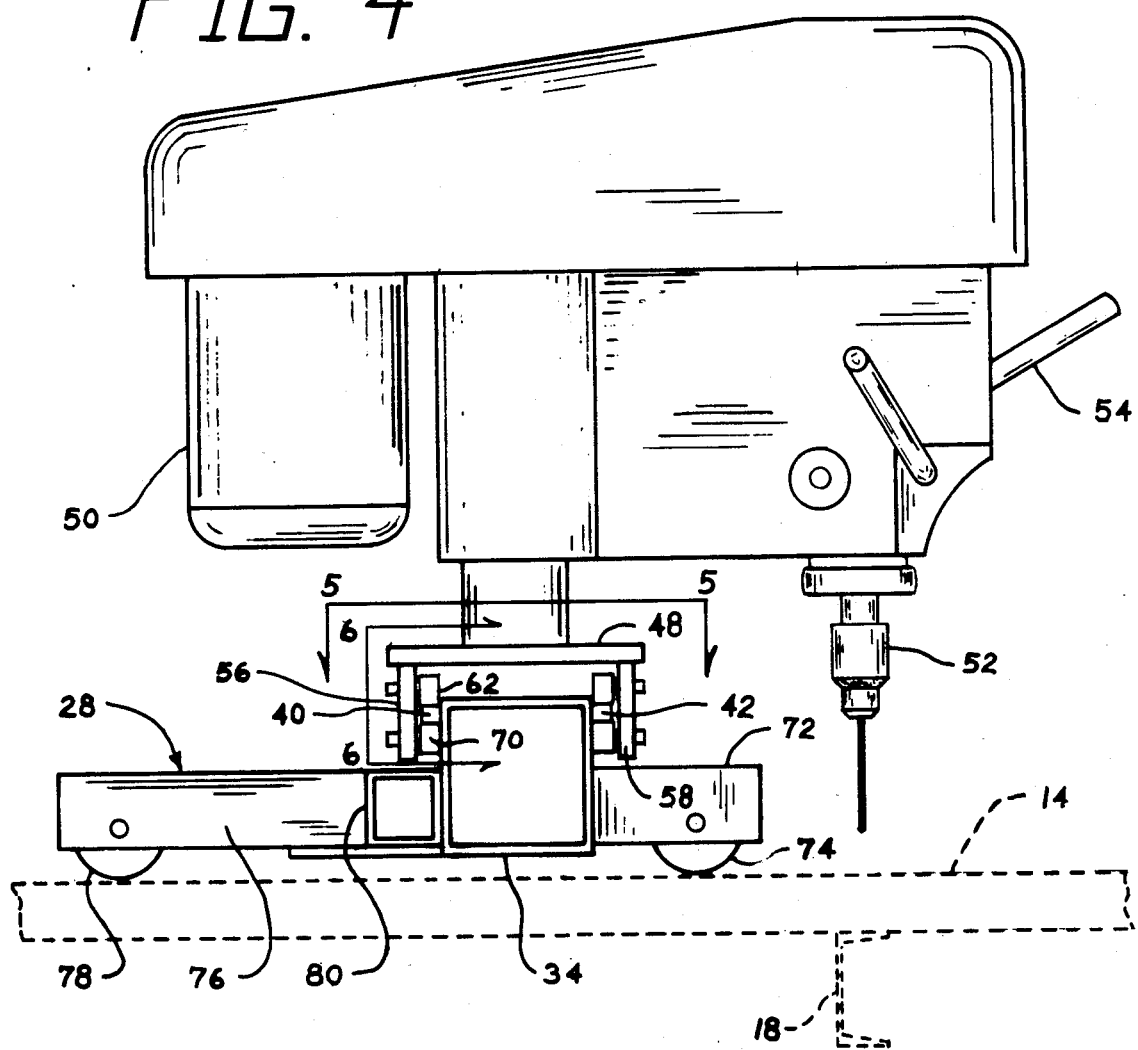
FIG. 4 is an enlarged view in elevation taken from the left side of FIG. 2.

The structure of the drill press 24, wheeled carriage 22 and support beam 20 for the cross rails is best shown in FIG. 4. As there shown the support beam is in the form of a box beam 34 having vertical sides and to which are connected rectangular cross rails 40 and 42 which may be slightly below the top surface of the beam 20. The cross rails support the wheeled carriage for transversing movement in an X-direction across the trailer deck to any selected position and otherwise align the wheeled carriage.

The carriage 22 is comprised of a platform base 48 which supports the drill press 24. The drill press is of conventional heavy duty construction comprised of the usual motor 50 and connecting mechanism to power a rotary drill chuck 52 raised and lowered by a handle 54.

The carriage platform base 48 is further provided with a pair of wheel support plates 56 and 58 on opposed sides of the box beam and cross rails which support upper and lower wheels of the carriage. The support plates are closely spaced to the cross rails 40 and 42. The support plates may by engaging the sides of the cross rails, act as a guide for the wheels as they move along the cross rails as may also the top sides of the beam above the rails. Either or both of these guides may be employed.

Figure 6:
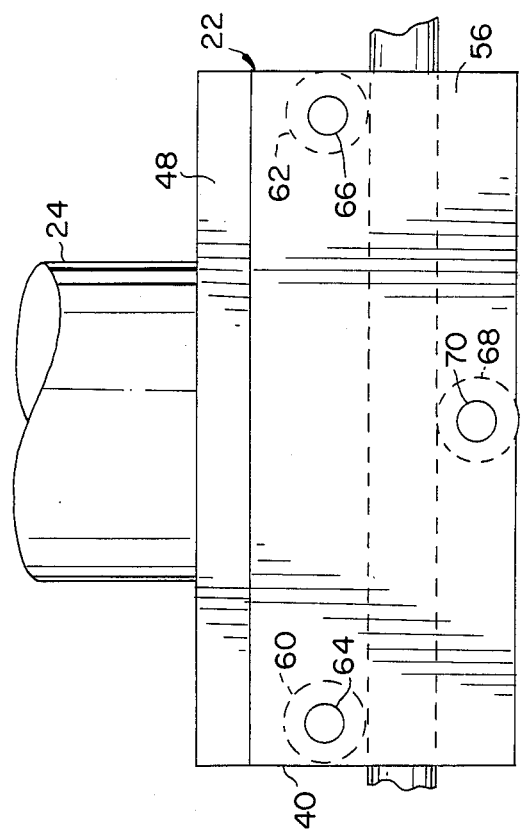
FIG. 6 is an enlarged view taken on the line 6—6 of FIG. 4 showing the wheel support plate of the carriage.

As shown in FIG. 6 in dotted lines a pair of upper rollers 60 and 62 are journalled with axles 64 and 66, respectively, at the upper portion of the support plate and ride upon cross rail 40. A lower roller 68, also shown in dotted lines is journalled with axle 70 to the lower portion of the plate to bear against the lower side of the cross rail 40 to counteract any tilting thrust from the carriage and drill press in the drilling operation. Identical rollers are employed on the other support plate 58 for the same purpose to provide stability and the same reference numerals are employed.

Figure 3:
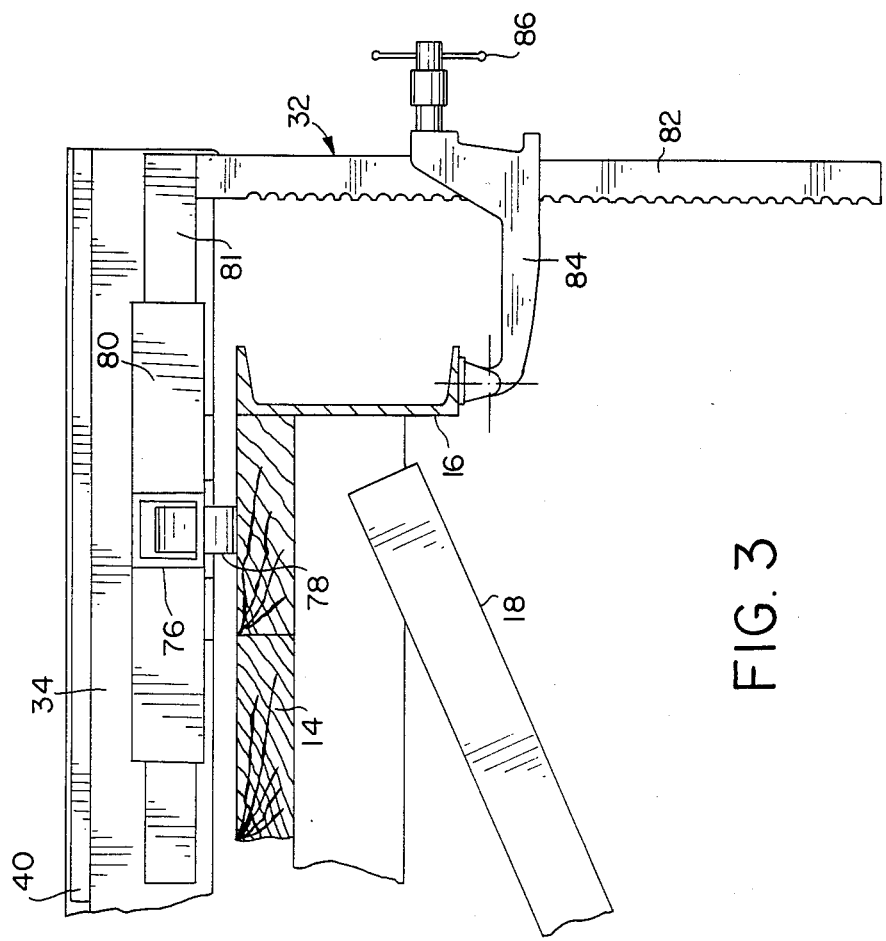
FIG. 3 is an enlarged view in section taken on the line 3—3 of FIG. 1.
Figure 5:
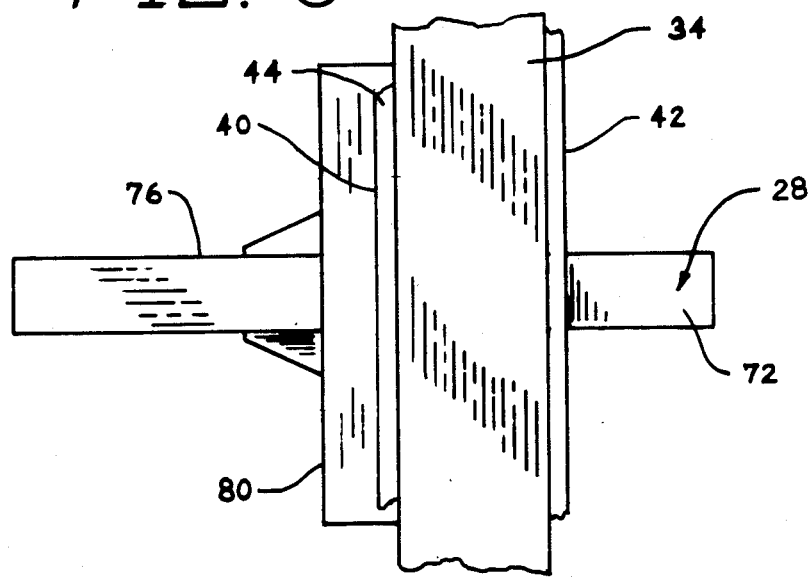
FIG. 5 is a view in section taken on the line 5—5 of FIG. 4.

The wheeled truck 28 is shown in FIGS. 3, 4 and 5. It is comprised of a housing connected to the support beam 34. It has forward section 72 in which a roller 74 is journalled and a rear section 76 likewise receiving a roller 78. The rear section is somewhat longer to provide stability for the weight of the drill press and to counteract any upward thrust developed in the drilling operation. A socket 80 welded to the support beam 34 and the rear housing section 76 adjustably receiving a support bar 81 for the clamp 32 as will further appear hereinbelow.

The clamp 32 is best shown in FIGS. 3 and 4. It is comprised of a rack 82 receiving a jaw 84 and a tightening handle 86. The jaw is adapted to clamp against an underside of the trailer side rail 16 in the relation shown in FIG. 3 to anchor the machine in firm position on the deck 14 of the trailer. The top of the rack is fixed to the support bar 81 in order that the clamp 32 on either side of the machine may be laterally adjusted to accommodate trailers of varying width and frame construction.

USE

The drilling machine of this invention is very simply erected and operated. The original erection is accomplished by simply placing the beam 34 with its attached trucks 26 and 28 upon the flat deck of the trailer to be drilled. This may be done with the carriage 22 and 24 already emplaced on the cross rails 40 and 42 or the fitting upon the rails may be done after the emplacement of the support beam and the trucks as will be readily understood.

After installation upon the deck the machine is moved longitudinally in a Y-direction to a selected position. The clamps 30 and 32 are then moved laterally with the support bars 81 sliding in the sockets 80 to a proper lateral clamping position. The clamps are then tightened.

The above steps firmly anchor the machine which is then ready for use. The carriage 22 and drill press 24 may be easily moved along the rails 40 and 42 in an X-direction to any selected position to perform the drilling operation. After the drilling, the planking 14 may be secured to the underlying trailer frame 18 in conventional fashion by the use of screws, bolts or the like.

After drilling of holes crosswise in one setting of the machine, movement may then be effected to another longitudinal position by simply loosening the clamps 30 and 32 and moving the machine with the wheeled trucks 26 and 28 to the next selected position.

In the drilling operation the unique upper and lower wheel arrangement of the carriage simplifies movement across the trailer. The box beam 34 supports the entire structure of the machine. The upper and lower wheels of the carriage also act to balance the machine and resist any tendency to tilt due to the weight of the carriage and drill press either in the movement along the rails, during the drilling operation or even when carrying the machine with the carriage installed upon the cross rails.

Various changes and modifications may be made within this invention as will be apparent to those skilled in the art. Such changes and modifications are within the scope and teaching of this invention as defined by the claims appended hereto.

What is claimed is:

1. A drilling machine for drilling holes in the deck of a flat bed trailer or the like, said machine being supported on the deck and being moveable upon a top surface of the deck and along the length of the trailer deck and supporting a drill press moveable upon said machine across the width of the trailer deck, said machine comprising a support beam connected at opposite ends to wheeled trucks supported upon a top surface of the trailer deck and moveable therealong, cross rails fixed at opposite sides of said beam, a carriage supporting said drill press and provided with wheels supporting said carriage upon said rails, said machine being further provided with clamps at opposite ends of said machine, said clamps being supported upon said machine above said deck and extending freely in spaced relation around a side of the trailer and being provided with means for cross-wise adjustment to accommodate trailers of varying width, said clamps being adapted to clamp against an underside of said trailer to anchor firmly said machine in selected positions of longitudinal adjustment along the length of the trailer deck.

2. The drilling machine of claim 1 in which the cross rails have opposed upper and lower surfaces engageable by upper and lower wheels of said carriage, respectively, to provide stability against any tendency of the carriage and drill press to tilt while supported upon said rails.

3. The drilling machine of claim 2 in which downwardly depending support plates are provided on said carriage closely spaced to outside surfaces of said cross rails, said wheels supporting said carriage being journalled to inside portions of said support plates and said support plates acting as guides to maintain said carriage wheels upon said cross rails.

4. The drilling machine of claim 2 in which the support beam is a box beam, the cross rails are fixed to opposite vertical sides of said beam below a top of the beam and said rollers are closely spaced to said sides to provide a guide for said rollers and the supported carriage and drill press.

5. The drilling machine of claim 2 in which downwardly depending support plates are provided on said carriage closely spaced to outside surfaces of said cross rails, said wheels supporting said carriage being journalled to inside portions of said support plates and said support plates acting as guides to maintain said carriage wheels upon said cross rails and the support beam is a box beam, the cross rails are fixed to opposite vertical sides of said beam below a top of the beam and said rollers are closely spaced to said sides to provide a guide for said rollers and the supported carriage and drill press.

6. A drilling machine for drilling holes in the deck of a flat bed trailer or the like, said machine being moveable along the length of a trailer deck and supporting a drill press moveable upon said machine across the width of the trailer deck, said machine comprising a support beam connected at opposite ends to wheeled trucks supported upon a top surface of the trailer deck and moveable therealong, cross rails fixed at opposite sides of said beam, a carriage supporting said drill press and provided with wheels supporting said carriage upon said rails, said machine being further provided with clamps at opposite ends of said beam adapted to clamp against an underside of said trailer to anchor firmly said machine in selected positions of longitudinal adjustment along the length of the trailer deck, said wheeled trucks being comprised of a forward section connected to said support beam and supporting a deck engaging wheel therein and a rear section likewise connected to said support beam and supporting a deck engaging wheel therein at a greater distance from the support beam than the wheel in the forward section to provide stability against tilting for the machine and back thrust during a drilling operation.

7. A drilling machine for drilling holes in the deck of a flat bed trailer or the like, said machine being moveable along the length of a trailer deck and supporting a drill press moveable upon said machine across the width of the trailer deck, said machine comprising a support beam connected at opposite ends to wheeled trucks supported upon a top surface of the trailer deck and moveable therealong, cross rails fixed at opposite sides of said beam, a carriage supporting said drill press and provided with wheels supporting said carraige upon said rails, said machine being further provided with clamps at opposite ends of said beam adapted to clamp against an underside of said trailer to anchor firmly said machine in selected positions of longitudinal adjustment along the length of the trailer deck, said clamps being connected to a member slidably receivable in a socket connected to said support beam to provide for lateral adjustment of the clamps for trailers of varying width.

8. A drilling machine for drilling holes in the deck of a flat bed trailer or the like, said machine being moveable along the length of a trailer deck and supporting a drill press moveable upon said machine across the width of the trailer deck, said machine comprising a support beam connected at oposite ends to wheeled trucks supported upon a top surface of the trailer deck and moveable therealong, cross rails fixed at opposite sides of said beam, a carriage supporting said drill press and provided with wheels supporting said carraige upon said rails, said machine being further provided with clamps at opposite ends of said beam adapted to clamp against an underside of said trailer to anchor firmly said machine in selected positions of longitudinal adjustment along the length of the trailer deck, the cross rails having opposed upper and lower surfaces engageable by upper and lower wheels of said carriage, respectively, to provide stability against any tendency of the carriage and drill press to tilt while supported upon said rails and said wheeled trucks being comprised of a forward section connected to said support beam and supporting a deck engaging wheel therein and a rear section likewise connected to said support beam and supporting a deck engaging wheel therein at a greater distance from the support beam than the wheel in the forward section to provide stability against tilting for the machine and back thrust during a drilling operation.

9. A drilling machine for drilling holes in the deck of a flat bed trailer or the like, said machine being supported on the deck and being moveable upon a top surface of the deck and along the length of the trailer deck and supporting a drill press moveable upon said machine across the width of the trailer deck, said machine comprising a support beam connected at opposite ends to wheeled trucks supported upon a top surface of the trailer deck and moveable therealong, cross rails fixed at opposite sides of said beam, a carriage supporting said drill press and provided with wheels supporting said carriage upon said rails, said machine being further provided with clamps at opposite ends of said machine adapted to clamp against an underside of said trailer to anchor firmly said machine in selected positions of longitudinal adjustment along the length of the trailer deck, the cross rails having opposed upper and lower surfaces engageable by upper and lower wheels of said carriage, respectively, to provide stability against any tendency of the carriage and drill press to tilt while supported upon said rails, downwardly depending support plates being provided on said carriage closely spaced to outside surfaces of said cross rails, said wheels supporting said carriage being journalled to inside portions of said support plates and said support plates acting as guides to maintain said carriage wheels upon said cross rails, said wheeled trucks being comprised of a forward section connected to said support beam and supporting a deck engaging wheel therein and a rear section likewise connected to said support beam and supporting a deck engaging wheel therein at a greater distance from the support beam than the wheel in the forward section to provide stability against tilting for the machine and back thrust during a drilling operation, said clamps being connected to a member slidably receivable in a socket connected to said support beam to provide for lateral adjustment of the clamps for trailers of varying width.

* * * * *